(12) United States Patent
Chmiel et al.

(10) Patent No.: US 8,311,000 B2
(45) Date of Patent: Nov. 13, 2012

(54) METHOD FOR MAINTAINING SYNCHRONISATION IN A RADIO COMMUNICATIONS SYSTEM

(75) Inventors: Mieszko Chmiel, Glucholazy (PL); Jaroslaw Niewczas, Nürnberg (DE)

(73) Assignee: Nokia Siemens Networks Oy, Espoo (FI)

( * ) Notice: Subject to any disclaimer, the term of this patent is extended or adjusted under 35 U.S.C. 154(b) by 678 days.

(21) Appl. No.: 12/308,712

(22) PCT Filed: Jun. 18, 2007

(86) PCT No.: PCT/EP2007/056031
§ 371 (c)(1), (2), (4) Date: Oct. 9, 2009

(87) PCT Pub. No.: WO2007/147808
PCT Pub. Date: Dec. 27, 2007

(65) Prior Publication Data
US 2010/0067497 A1  Mar. 18, 2010

(30) Foreign Application Priority Data

Jun. 21, 2006 (EP) .................................. 06460015

(51) Int. Cl.
*H04W 4/00* (2009.01)
*H04J 3/06* (2006.01)
(52) U.S. Cl. .................. 370/329; 370/344; 370/350
(58) Field of Classification Search .................. 370/329, 370/344, 350
See application file for complete search history.

(56) References Cited

U.S. PATENT DOCUMENTS

| 2003/0012167 A1* | 1/2003 | Benveniste ................ 370/338 |
| 2004/0252662 A1 | 12/2004 | Cho |
| 2005/0047429 A1 | 3/2005 | Koo et al. |

* cited by examiner

*Primary Examiner* — Kenny Lin
(74) *Attorney, Agent, or Firm* — Staas & Halsey LLP

(57) ABSTRACT

A method for maintaining synchronization of a user terminal (UE) in a radio communication system is proposed, wherein resources reserved for transmissions of random access signals are divided into at least one first portion for contention-based communication, and at least one second portion of said resources for contention-free communication, and wherein a user terminal (UE) is assigned at least one resource of the portion assigned to the contention-free communication, for transmitting signals for maintaining synchronization.

10 Claims, 2 Drawing Sheets

Move to NB:
• Higher inter-cell interference, but smaller Path-loss → handover signalling triggered later
• Shorter propagation delay
• Intra-NB synchronized handover more probable Move from NB:
• Higher inter-cell interference, and bigger Path-loss → handover signalling triggered sooner
• Longer propagation delay
• Inter-NB non-synchronized handover more probable

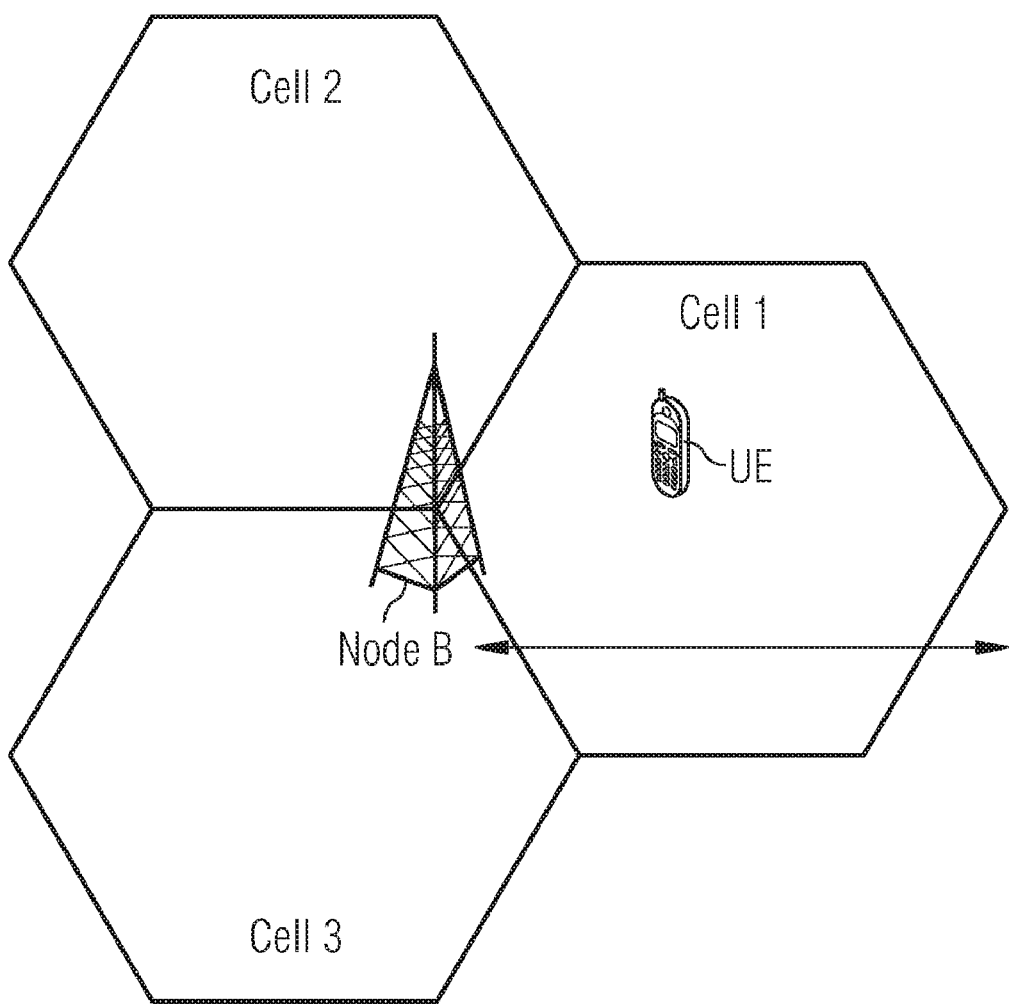

FIG 2

Move to NB:
- Higher inter-cell interference, but smaller Path-loss → handover signalling triggered later
- Shorter propagation delay
- Intra-NB synchronized handover more probable Move from NB:
- Higher inter-cell interference, and bigger Path-loss → handover signalling triggered sooner
- Longer propagation delay
- Inter-NB non-synchronized handover more probable

METHOD FOR MAINTAINING SYNCHRONISATION IN A RADIO COMMUNICATIONS SYSTEM

CROSS REFERENCE TO RELATED APPLICATIONS

This application is based on and hereby claims priority to European Application No. EP06460015 filed on Jun. 21, 2006 and PCT Application No. PCT/EP2007/056031 filed on Jun. 18, 2007, the contents of which are hereby incorporated by reference.

BACKGROUND OF THE INVENTION

The invention relates to a method for maintaining synchronization in a radio communications system. A synchronous random access operation may be used in mixed contention-based and contention-free modes for uplink time synchronization and/or power control.

In radio communications systems, a situation when a mobile station has temporary no data to transmit and/or receive, i.e. it is inactive, arise. However, it is desirable that the mobile station can quickly restart its transmission and/or reception. Such short reactivation time of less than 50 ms is defined as one of the fundamental requirements of currently standardized E-UTRA, see for example the technical specification 3GPP TS 25.913. It is assumed that user terminals (UE—User Equipment) will be kept synchronized with the network for a certain time even when not being in an active state anymore. More specifically, the UE, e.g. a dormant user terminal in a so called RRC Connected state, shall be kept uplink (UL) time synchronized in order to allow for a fast restart of transmissions and avoid time consuming non-synchronized random access procedures. During such inactivity time, the UE may be configured by the network with DRX/DTX (Discontinuous Reception/Transmission) cycles. Moreover, due to efficiency reasons it may be desirable that after some time of inactivity, which may depend on the used service, priority etc., the UE is allowed to lose the UL time synchronization, and in this case in order to obtain a timing advance or to request resources, the UE must use so called non-synchronized random access mechanisms.

SUMMARY

During a random access, it is possible for the user terminal to communicate with a network's base station (Node B) in both non-synchronized, i.e. with no time synchronization and lack of precise power control, and synchronized modes. A synchronized mode is both time- and power-controlled via closed-power loop. The inventors studied how to deal with synchronized modes of operation and describe how to efficiently keep inactive user terminals uplink time synchronized.

The inventors propose a method and system that may reduce the inefficiency of non-synchronized contention-based random access is solved. The inventors propose to maintain uplink synchronization of dormant user terminals using synchronized, contention-free random access, while also allowing for "on-demand" user terminal resource requests using synchronized contention-based random access.

In radio communications systems presently known, different mechanisms for initial and random access exist, which are discussed in the following.

According to the GSM standard, uplink transmissions from different user terminals are time aligned at the base station: • Initial Access: contention-based access burst containing synchronization sequence, and small amount of data are sent by the user terminal so that the base station can estimate and if necessary adjust the user terminal's uplink timing advance. An access burst uses a guard period to take into account initial time uncertainty due to an unknown propagation delay. The transmission timing of access bursts is based on the timing of received downlink signal.

Circuit switched voice: the timing advance is controlled by the base station. During voice spurts the uplink timing measurements are based on normal burst voice packets or the dedicated Slow Associated Control Channel (SACCH). During voice gaps, i.e. when DTX is used at the user terminal, the uplink timing measurements are based either on periodically send SID (silence indicator description) frames or on the SACCH. The time advance update interval is constant i.e. every four multi-frames (480 ms).

Packet switched data (GPRS): the timing advance is controlled by the base station. When the user terminal is allocated uplink resources and is transmitting, the timing advance measurements are based on the transmitted data packet(s). The timing advance update interval is every four multi-frames (480 ms). When the user terminal is not transmitting or has no allocated uplink resources, the timing advance is based on contention-free (possibly non-synchronized, i.e. the guard time is still used) access bursts sent by the user terminal once every eight multi-frames (960 ms).

According to the WCDMA (Wideband CDMA or UTRA FDD) standard:

Initial access: the user terminal uses the contention-based random access channel, i.e. preamble part with power open loop power control and power ramping, for initial access to establish connection or request resources, but not to obtain uplink time advance.

Uplink transmissions from different user terminals are not time aligned at the base station. The timing of up-link transmissions at the user terminal has a fixed relation to the timing of the received downlink (DL) signal. Therefore, UL signals of user terminals with different propagation delays are not time aligned at the base station.

According to the so called WiMAX standard IEEE 802.16:
• A specific number of sub-channels are allocated for random access, both initial and periodic (used for timing and power adjustments). Access type is contention-based only.

According to the current proposals for 3GPP Long Term Evolution (LTE), received uplink signals (sub-frames) from different user terminals are time aligned at the base station:• Initial access: contention-based non-synchronized random access bursts are used to obtain uplink time advance and to request resources. The non-synchronized random access bursts contain at least a signature sequence and possibly a message part. Currently, one or two-step procedures are considered, see for example the technical specification TS 25.814. These bursts are used during initial access but they may be also used when the user terminal lost uplink time synchronization or while in non-synchronized handover. The TDM/FDM (Time/Frequency Division Multiplex) structure of the non-synchronized random access channel (RACH) is considered, i.e. bursts use time/frequency resources which are orthogonal to resources used for other scheduled data transmissions. Currently, the assumption is that due to a required guard time one sub-frame (0.5 ms) of three or multiple of three resource units (75 sub-carriers) will be reserved for non-synchronized random access in every radio frame (10 ms).

Synchronized random access: it is furthermore assumed that contention-based synchronized random access bursts are used to request uplink resources when the user terminal is uplink time synchronized. Such bursts occupy significantly less time/frequency resources than non-synchronized random access bursts, because no guard time is needed. As an example, this may be one DFT-OFDM symbol (66.66 us) with one or multiple frequency resource units (25 sub-carriers) every two sub-frames.

According to one aspect, it is proposed to reserve a first part of available synchronous random access resources for contention-based communication in order to perform user terminal resource requests, while a second part of the available resources are used for contention-free communication. In the following, this latter part of the resources is called dummy synchronized random access bursts.

It is assumed that traffic on the contention-free part is controlled by the base station, wherein each user terminal is assigned a unique transmit opportunity, e.g. a slot, at regular pre-determined intervals, e.g. one every second or half a second. With such a fixed transmission pattern, no downlink resources would be needed for scheduling. The contention-free dummy random access bursts are used to maintain sufficient uplink timing synchronization and power control, so that the user terminals are able to reactivate almost instantly with high probability.

According to a further aspect, the interval for transmitting dummy random access bursts is variably determined based on e.g. the current user terminal's speed or capability to move.

According to a further aspect, dummy random access bursts are used not only to measure and possibly adjust the user terminal's timing advance and/or transmit power via the base station, but also for carrying some signaling information like e.g. downlink CQIs (channel quality indicator).

According to a further aspect, dummy random access bursts used for transmissions of timing control and/or power control and/or CQI are retransmitted in case of failed reception at the base station.

According to a further aspect, contention-based random access bursts are used for instantly requesting resources, and possibly for retransmission of contention-free random access bursts with resource requests. Advantageously, appropriate splitting of the synchronized random access resources allows for a substantial reduction in the overall required overhead by exploiting trunking gain. The percentage of such contended traffic would be small, possibly in the range of 5-10% of the synchronized random access resources.

According to a further aspect, dummy random access bursts are transmitted together with uplink reference symbols, i.e. symbols known to the receiver, to allow uplink channel sounding in order to maintain up-to-date information about the user terminal's channel condition at the scheduler. Such reference symbols may also be used for channel estimation to improve demodulation and/or detection of the synchronized random access bursts.

In contrast to known algorithms based on non-synchronized contention-based random access, which would make it difficult to enable a reconnection within 50 ms, the method proposed by the inventors is flexible and allows for more predictable and guaranteed ability to reconnect with only a limited number of resources assigned to it.

As an example, in case of contended-mode, whether synchronized or not, a significant number of resource, would have to be allocated to keep the probability of collisions of signals at the receiver low. If, for example, the average RACH traffic is 5 messages per 10 ms (in a cell), one would need to provide at least 20 unique opportunities within that 10 ms period, to keep the probability of collisions below 25%, or >50 opportunities for a probability of collisions below 10%. Such resource allocation would significantly diminish the overall capacity of the system. In contrast, with a scheduled contention-free access according to the proposed method, only 5 opportunities would be needed.

Moreover, the separation of synchronized RACH resources into contended and contention-free resources reflects more accurately the nature of traffic in the random access channel, wherein a significant portion is regular and thus predictable, like e.g. RACH sequences transmitted by user terminals to maintain synchronization with the base station. Instead, the use of a contented mode would not be efficient for such traffic because of collision risks, delays arising from such collisions and required additional overhead. The use of the known contention-free mode provides transmit opportunities at regular intervals, e.g. in the range of 0.25 s to 5 s, which would be far too long. Since only a small portion of the overall traffic would require the contended mode, the additional overhead would not be significant. The inventors therefore propose to separate the synchronized resources, thus allowing both ways of access.

Alternative or additional mechanisms for tracking uplink timing and/or transmit power of user terminals are discussed in the following.

According to one aspect, CQI reports (transmitted via outband signaling in uplink to the base station) of downlink channel conditions determined by the user terminal could be used to track the user terminal's timing and/or transmit power. There is a need for transmitting such CQI reports whenever the user terminal receives data in downlink from the base station. Instead, if no data is sent in uplink or received in downlink, CQI reports may not be transmitted or transmitted with a longer interval compared with the case when the downlink is active, see for example the technical report TR 25.903 relating to the so called continuous connectivity.

Furthermore, uplink reference signals, e.g. pilot symbols, may be used to track uplink timing and/or transmit power. However, such resources assigned to pilots are limited and more related to detection, demodulation and channel sounding procedures of active users.

According to another aspect, which might be regarded as being independent from the above description, a position of a random access burst within a frame is disclosed.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a radio communication system and illustrates movement of a user terminal.

DETAILED DESCRIPTION OF THE PREFERRED EMBODIMENT

Figure 1:
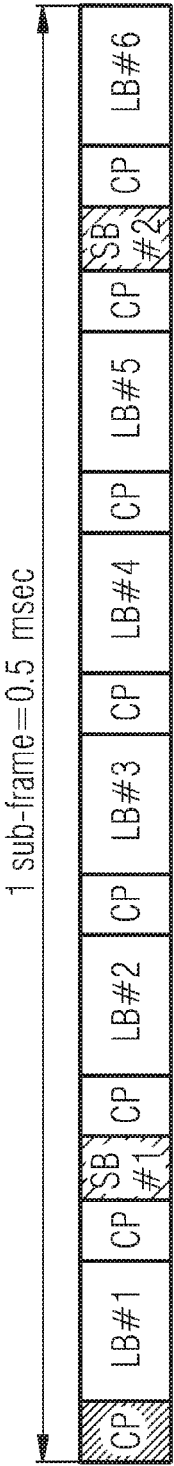
FIG. 1 shows a sub-frame structure.

Reference will now be made in detail to the preferred embodiments of the present invention, examples of which are illustrated in the accompanying drawings, wherein like reference numerals refer to like elements throughout.

According to the current proposals for 3GPP Long Term Evolution (LTE), if assumed that synchronized random access bursts are transmitted in one or several so called long blocks (LB) within a sub-frame. The sub-frame structure shown in FIG. 1 is e.g. disclosed in the technical specification TR 25.814, V7.0.0, FIG. 9.1.1-4. Such long blocks are protected by guard intervals called cyclic prefix (CP). There are 8 cyclic prefixes per sub-frame but only one of them is mandated to be longer than the others, in order to allow filter ramp-ups/ramp-downs.

According to this further aspect, it is proposed to use such long blocks protected by a longer cyclic prefix for transmitting synchronized random access bursts. According to FIG. 1, this could be e.g. the long block LB#1 preceded by a longer cyclic prefix. Of course, at present there is no definition of which of the long blocks will be preceded by the longer cyclic prefix, therefore, the proposals are not limited to aforesaid example.

Depending on the system bandwidth, the length of a long block is 66.67 us and the regular cyclic prefix is approx. 4.13 . . . 3.65 us, while the longer cyclic prefix is approx. 4.39 . . . 7.81 us long.

By transmitting synchronized random access bursts in blocks which are preceded by a longer guard interval, additional protection is achieved because especially the time synchronization of the above described dummy random access bursts is not as accurate, i.e. less than the duration of the cyclic prefix, as it is in active mode when data is being transmitted in the uplink. In active mode, the accuracy is within a fraction of a cyclic prefix.

Figure 3:
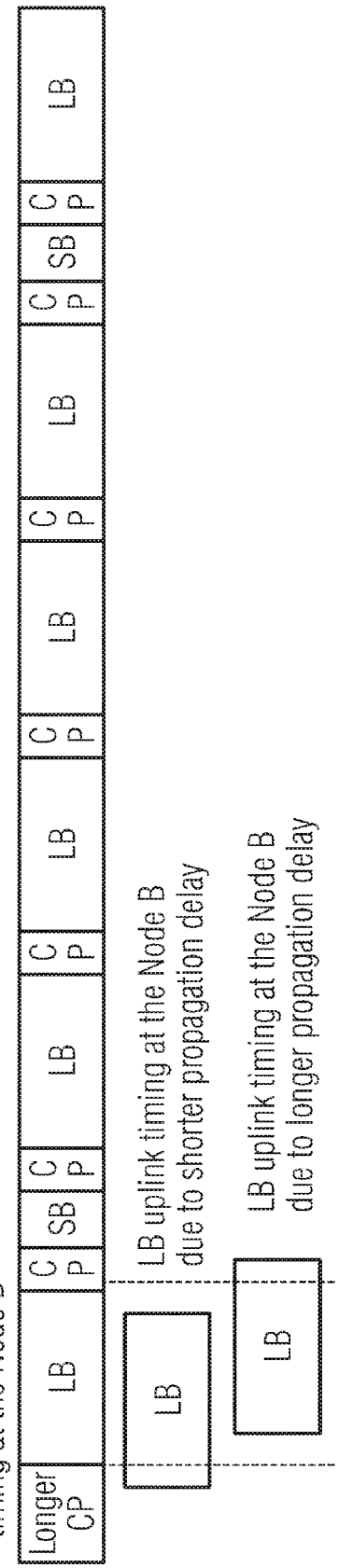
FIG. 3 shows a sub-frame structure with signals used for maintaining uplink synchronization at a longer cyclic prefix.

Assuming an equal probability of the user terminal UE moving towards or away from the base station Node B, it is more likely that the move away from the base station Node B will trigger handover signaling sooner that the move towards the base station Node B, as it is illustrated in FIG. 2. For this reason, it would be more beneficial to put the signals used for maintaining uplink synchronization at the longer cyclic prefix, as shown in FIG. 3. Losing synchronization due to shorter propagation delays is more likely than losing synchronization due to longer propagation delays, because the latter one, on average, will sooner trigger handover signaling, which in turn will be used to keep or adjust timing advance. However, placing signals used for maintaining uplink synchronization before the longer cyclic prefix would also be advantageous compared to placing such signals before normal cyclic prefixes.

Although it would in general be sufficient to use only one long block per sub-frame transmitted every number of sub-frames for tracking uplink timing, if more consecutive time resources within a sub-frame are used for these signals, the solution to protect that signal with the longer cyclic prefix is still applicable.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of maintaining synchronization of a user terminal in a radio communications system, comprising:
dividing resources reserved for transmission of random access signals into at least one first portion for contention-based communication and at least one second portion of the resources for contention-free communication; and
assigning at least one resource of the at least one second portion assigned to the contention-free communication to the user terminal in order to transmit signals to maintain synchronization,
wherein the at least one second portion of the resources for contention-free communication includes dummy random access burst signals.

2. The method according to claim 1, wherein the user terminal is in an inactive state when the user terminal uses the assigned at least one resource of the at least one second portion.

3. The method according to claim 1, wherein the user terminal uses the at least one resource of the at least one second portion for a predetermined time interval.

4. The method according to claim 2, wherein the user terminal uses the at least one resource of the at least one second portion for a predetermined time interval.

5. The method according to claim 1, wherein the dummy random access bursts include signaling information including a downlink channel quality indicator.

6. The method according to claim 1, wherein an interval for transmitting the dummy random access bursts is based on a current speed of the user terminal or a mobility characteristic of the user terminal.

7. The method according to claim 1, wherein the dummy random access bursts a transmitted together with uplink reference symbols.

8. A radio communications system, comprising:
a user terminal dividing resources reserved for transmission of random access signals into at least one first portion for contention-based communication and at least one second portion of the resources for contention-free communication and being assigned at least one resource of the at least one second portion assigned to the contention-free communication in order to transmit signals to maintain synchronization,
wherein the at least one second portion of the resources for contention-free communication includes dummy random access burst signals.

9. The radio communications system according to claim 8, further comprising:
at least one base station dividing resources reserved for transmission of random access signals into at least one first portion for contention-based communication and at least one second portion of the resources for contention-free communication and the user terminal is assigned at least one resource of the at least one second portion assigned to the contention-free communication in order to transmit signals to maintain synchronization.

10. A radio communications system, comprising:
a base station dividing resources reserved for transmission of random access signals into at least one first portion for contention-based communication and at least one second portion of the resources for contention-free communication and being assigned at least one resource of the at least one second portion assigned to the contention-free communication in order to transmit signals to maintain synchronization,
wherein the at least one second portion of the resources for contention-free communication includes dummy random access burst signals.

* * * * *